US012169001B2

(12) United States Patent
Sausset et al.

(10) Patent No.: US 12,169,001 B2
(45) Date of Patent: Dec. 17, 2024

(54) SENSOR BEARING UNIT WITH IMPROVED BREAKING TORQUE AND METHOD OF MANUFACTURING THEREOF

(71) Applicant: AKTIEBOLAGET SKF, Gothenburg (SE)

(72) Inventors: Vincent Sausset, Azay-le-Rideau (FR); Sylvain Chaussat, Mont-Pres-Chambord (FR)

(73) Assignee: AKTIEBOLAGET SKF, Gothenburg (SE)

( * ) Notice: Subject to any disclaimer, the term of this patent is extended or adjusted under 35 U.S.C. 154(b) by 82 days.

(21) Appl. No.: 18/304,783

(22) Filed: Apr. 21, 2023

(65) Prior Publication Data
US 2023/0358576 A1 Nov. 9, 2023

(30) Foreign Application Priority Data
May 6, 2022 (DE) .......................... 102022204478.9

(51) Int. Cl.
*F16C 19/06* (2006.01)
*F16C 33/58* (2006.01)
*F16C 41/00* (2006.01)
*F16C 43/04* (2006.01)
*G01P 3/44* (2006.01)

(52) U.S. Cl.
CPC .............. *F16C 43/04* (2013.01); *F16C 19/06* (2013.01); *F16C 33/586* (2013.01); *F16C 41/007* (2013.01); *G01P 3/443* (2013.01); *F16C 2220/40* (2013.01); *F16C 2226/12* (2013.01); *F16C 2226/70* (2013.01); *F16C 2226/80* (2013.01)

(58) Field of Classification Search
CPC ...... F16C 19/06; F16C 33/586; F16C 41/007; F16C 41/4304; F16C 2220/40; F16C 2226/12; F16C 2226/70; F16C 2226/80; G01P 3/443
See application file for complete search history.

(56) References Cited

U.S. PATENT DOCUMENTS 10,132,359 B2 11/2018 Chaussat et al.
2021/0072014 A1* 3/2021 Liverato ................. F16C 43/04

* cited by examiner

Primary Examiner — Phillip A Johnson
(74) Attorney, Agent, or Firm — J-TEK LAW PLLC; Scott T. Wakeman; Mark A. Ussai

(57) ABSTRACT

A sensor bearing unit includes a bearing, which has a first ring and a second ring, both rings being centered on an axis, and an impulse ring. The impulse ring includes a target holder, a target mounted on the target holder, and a sleeve secured to the first ring of the bearing. The sleeve is provided with an axial portion having at least one radial protrusion and a collar extending at least partially radially. The target holder is mounted radially around the axial portion of the sleeve and axially between the first ring of the bearing and the collar of the sleeve. The at least one radial protrusion of the sleeve axial portion extends into a complementary recess provided on the target holder.

11 Claims, 5 Drawing Sheets

SENSOR BEARING UNIT WITH IMPROVED BREAKING TORQUE AND METHOD OF MANUFACTURING THEREOF

CROSS-REFERENCE

This application claims priority to German Patent Application No. 102022204478.9 filed on May 6, 2022, the entire contents of which are fully incorporated herein by reference.

BACKGROUND OF THE INVENTION

The present invention relates to bearings, and more particularly to a sensor bearing unit including a bearing and an impulse ring.

Sensor bearing units are commonly used in a wide range of technical fields, for example, in the automotive industry and aeronautics. These units provide high quality signals and transmissions, while allowing integration in simpler and more compact apparatus.

Such a sensor bearing unit generally comprises a bearing, an impulse ring, and detection means facing the impulse ring. For example, the impulse ring may be provided with a target holder and with a magnetized target fixed to the target holder beyond the outer ring of the bearing. The magnetic target includes alternating North and South poles, the number of such poles depending on bearing size, detection precision and application specifics. The detection means may be fixed to the outer ring of the bearing or to a fixed casing. The magnetic target is typically attached to an outer tubular portion of the target holder.

In one type of impulse ring, as disclosed for example in U.S. Pat. No. 10,132,359, the impulse ring is provided with a fixing sleeve supporting the target holder and secured to the inner ring. The sleeve comprises an annular axial portion and a radial collar extending radially outwardly from the axial portion, the target holder being mounted axially between the inner ring of the bearing and the radial collar of the sleeve. Further, the axial portion of the sleeve is secured into the annular groove of the inner ring in order to prevent the rotation of the impulse ring relative to the inner ring.

It is essential that the impulse ring is fixedly connected in rotation with the bearing ring to which it is attached to prevent any relative displacement between the impulse ring and the bearing ring. However, current designs have a breaking torque between the target holder and the sleeve which is too low for some applications.

In U.S. Pat. No. 10,132,359, the impulse ring bore has a plurality of teeth. When the sleeve is axially fitted in the bore of the inner ring, the teeth induce local deformation of the sleeve and provide an anti-rotation means. However, this leads to a slight deformation impact on the sleeve and a low angular connection between the target holder and the sleeve.

SUMMARY OF THE INVENTION

One aim of the present invention is to provide a sensor bearing unit with improved angular connection between the target holder and the sleeve.

The present invention relates to a sensor bearing unit comprising a bearing provided with a first ring and a second ring both centered on an axis, and an impulse ring provided with a target holder, with a target mounted on the target holder, and with a sleeve secured to the first ring of the bearing and provided with an axial portion and a collar extending at least radially.

The target holder is mounted radially around the axial portion of the sleeve and axially mounted between the first ring of the bearing and the collar of the sleeve. According to a general feature, the axial portion of the sleeve comprises at least one radial protrusion extending into a complementary recess provided on the target holder. By having at least one radial protrusion of the sleeve extending into a complementary recess provided on the target holder, relative rotation between the sleeve and the target holder is prevented. Preferably, the complementary recess is provided on the bore of the target holder.

Advantageously, the axial portion of the sleeve comprises a plurality of circumferentially spaced radial protrusions, each radial protrusion extending into a separate one of a plurality of associated complementary recesses. The cooperation or engagement between each radial protrusion and its associated complementary recess further improves the angular connection between the target holder and the sleeve by preventing relative rotation. Preferably, the radial protrusions are circumferentially regularly spaced.

In one embodiment, the at least one radial protrusion is made in one part with, that is integral with, the axial portion of the sleeve. Alternatively, the at least one radial protrusion can be made from a separate part, i.e., other than the sleeve, which is fixed on the axial portion of the sleeve. Preferably, the radial protrusions are formed by radial plastic deformation of the axial portion of the sleeve.

In another embodiment, the sleeve radially abuts against a cylindrical surface of the first ring onto which is formed a plurality of axial grooves. The axial grooves increase the coefficient of friction between the first ring and the sleeve, therefore reducing the possibility of sliding movement between the two surfaces.

The present invention further relates to a method for manufacturing a sensor bearing unit, as described above, in which the at least one radial protrusion is formed during a plastic deformation step wherein the annular axial portion of the sleeve is locally radially pressed towards the target holder in order to be plastically deformed into the corresponding complementary recess provided on the target holder.

In one embodiment, the sleeve is secured to the first ring, notably by press-fitting. In another embodiment, the method further comprises, before the securing of the sleeve to the first ring, forming a plurality of axial grooves on a cylindrical surface of the first ring against which the sleeve is intended to radially abut.

BRIEF DESCRIPTION OF THE SEVERAL VIEWS OF THE DRAWINGS

The present invention and its advantages will be better understood by studying the detailed description of specific embodiments given by way of a non-limiting examples and illustrated by the appended drawings on which.

DETAILED DESCRIPTION OF THE INVENTION

Figure 1:
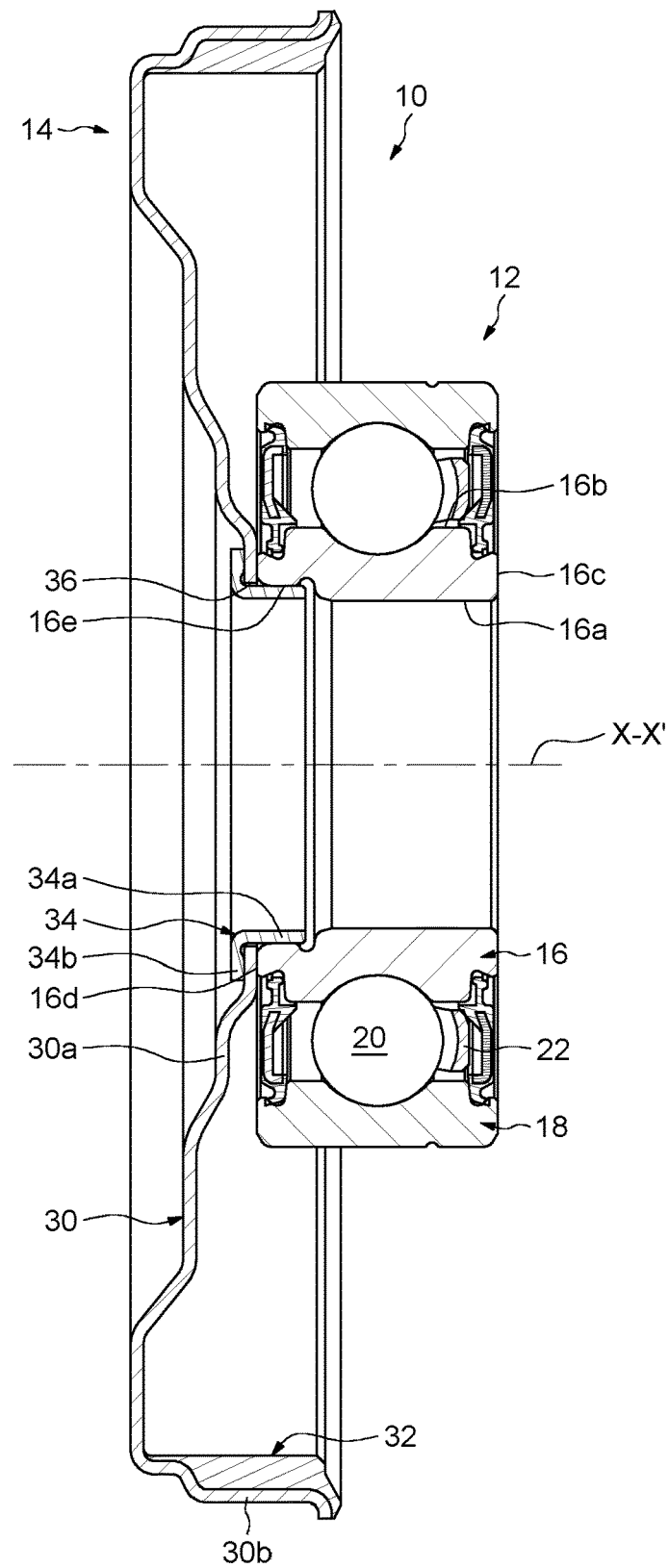
FIG. 1 is an axial section view of a sensor bearing unit according to an example of the invention before a plastic deformation step.

The sensor bearing unit 10 depicted in FIG. 1 is adapted to equip an apparatus such as a motor, a brake system, a suspension system or any rotating machine, in particular for an automotive vehicle. The sensor bearing unit 10 basically comprises a bearing 12 and an impulse ring 14 mounted on the bearing 12.

The bearing 12 includes a first ring 16 and a second ring 18. In the illustrated example, the first ring 16 is the inner ring whereas the second ring 18 is the outer ring. The inner and outer rings 16, 18 are concentric and extend axially along the bearing rotation axis X-X' which runs in an axial direction. Preferably, the inner and outer rings 16, 18 are made of steel.

In the illustrated example, the bearing 12 also includes a row of rolling elements 20, which are provided here in the form of balls, interposed between raceways (not indicated) formed on the inner and outer rings 16, 18. The rolling bearing 10 also includes a cage 22 for maintaining a regular circumferential spacing of the rolling elements 20.

The inner ring 16 of the bearing 10 is intended to be mounted on a shaft of the apparatus for tracking the rotation of the shaft. The inner ring 16 is intended to rotate while the outer ring 18 is intended to be fixed. The outer ring 18 can be mounted in a fixed support member or housing belonging to the apparatus.

The inner ring 16 has a cylindrical inner surface or bore 16a and an outer cylindrical surface 16b, which is radially opposite to the bore 16a. A circular raceway for the rolling elements 20 is formed in the outer cylindrical surface 16b, the raceway being directed radially outwardly.

The inner ring 16 also has two opposite radial lateral faces 16c, 16d which axially delimit the bore 16a and the outer surface 16b of the ring 16. Also, the inner ring 16 further includes a cylindrical groove 16e formed in the bore 16a. The groove 16e is centered on or about the axis X-X'. A diameter of bore 16a is smaller than a diameter of groove 16e. The groove 16e opens on the radial lateral face 16d.

The impulse ring 14 is mounted on the inner ring 16. The impulse ring 14 includes an annular target holder 30, a target 32 mounted on the target holder 30, and a fixing sleeve 34 secured to the inner ring 16.

Figure 2:
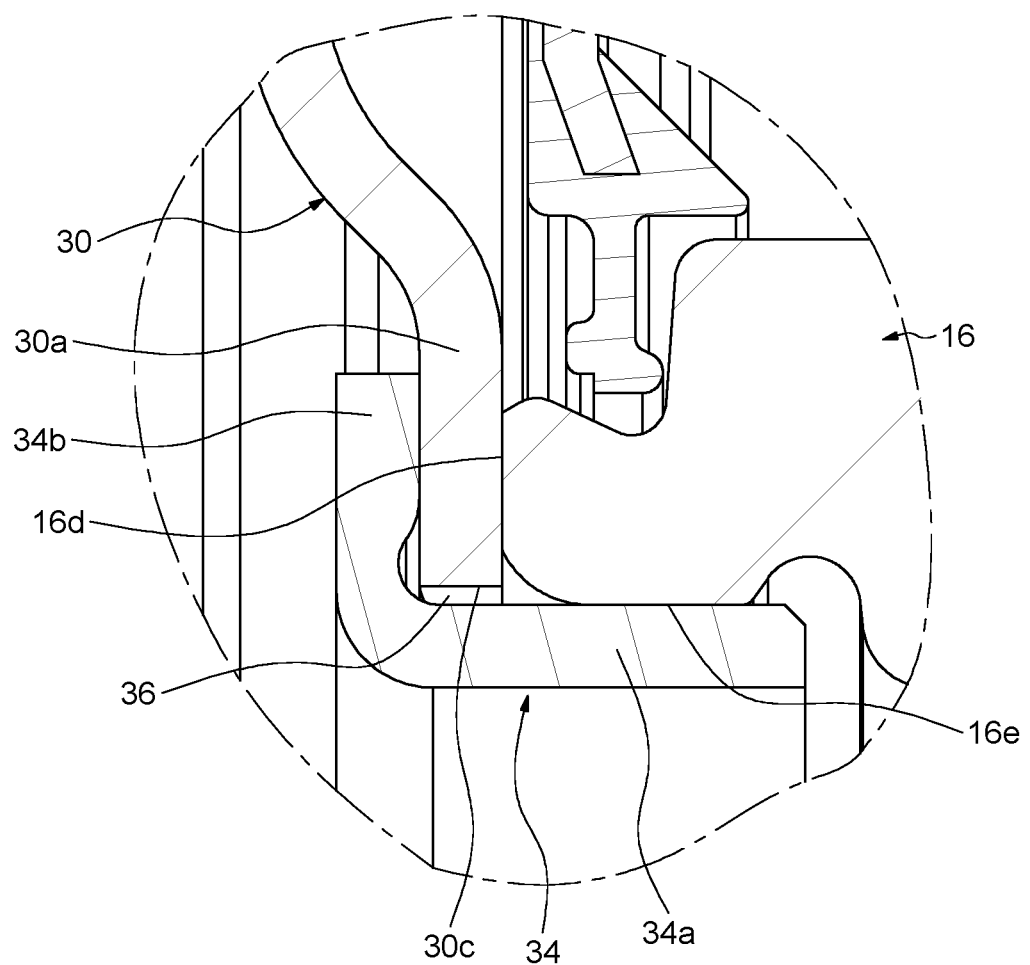
FIG. 2 is a detail view of FIG. 1.
Figure 3:
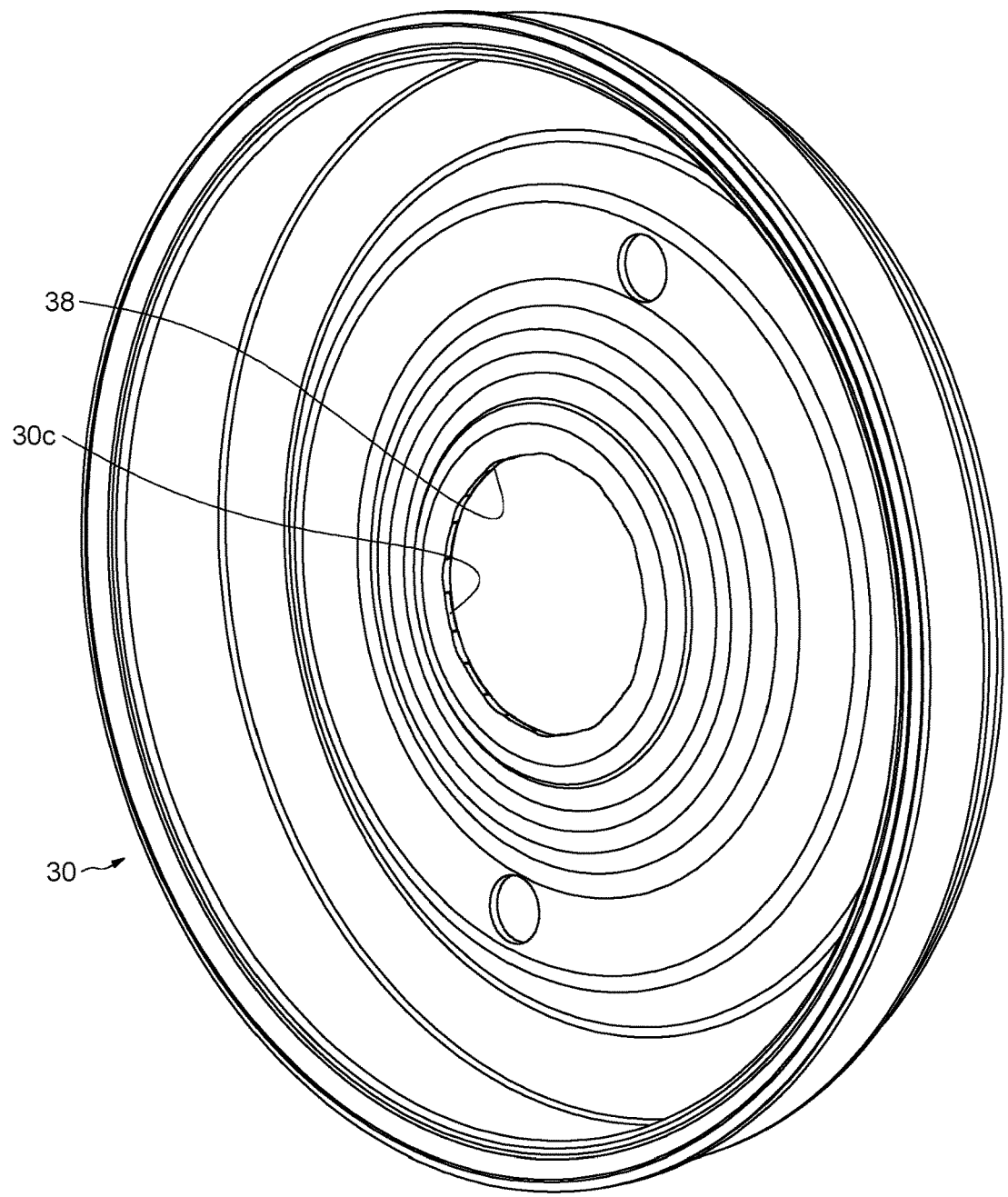
FIG. 3 is a perspective view of a target holder of an impulse ring of the sensor bearing unit of FIG. 1.
Figure 4:
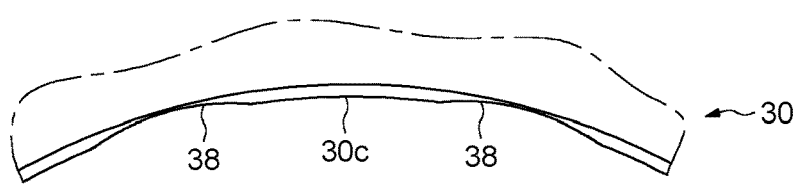
FIG. 4 is a detail view of the bore of the target holder of FIG. 3.

As shown more clearly in FIG. 2, the target holder 30 is axially secured to the inner ring 16 of the bearing by means of the sleeve 34. The target holder 30 is axially mounted between the lateral face 16d of the inner ring of the bearing and the sleeve 34. The target holder 30 is mounted radially around the sleeve 34. The target holder 30 is axially interposed and clamped between the lateral face 16d of the inner ring and the sleeve 34. The target holder 30 is in axial contact against the lateral face 16d of the inner ring 16 on one side and in axial contact with the sleeve 34 on the other side.

The target holder 30 includes an annular radial portion 30a defining the bore 30c of the target holder 30, and an outer annular axial portion 30b radially surrounding the bearing 12. The outer axial portion 30b is located radially above and outwardly from the outer ring 18 of the bearing 12. The outer axial portion 30b extends from the radially outer, large-diameter edge of the radial portion 30a.

The radial portion 30a of the target holder 30 is axially interposed and clamped between the lateral face 16d of the inner ring 16 of the bearing 12 and the sleeve 34. In the illustrated example, the radial portion 30a of the target holder 30 is provided with frustoconical parts or sections (not indicated) inclined with respect to the axis X-X' towards the opposite direction of the bearing 12. These frustoconical parts/sections prevent any interference between the target holder 30 and the outer ring 18 of the bearing 12.

The target 32 is mounted on the outer axial portion 30b of the target holder 30. In the disclosed example, the target 32 is mounted into the bore of the outer axial portion 30b. Alternatively, the target 32 may be mounted on the outer surface of the outer axial portion 30b.

In one embodiment, the target 32 includes magnetic North and South alternated poles. The target 32 is multi-polarly magnetized in the circumferential direction. The target 32 may be a plastic molded part and/or may be overmolded onto the target holder 30. Alternatively, the target 32 may be separately formed and secured onto the target holder 30 by any appropriate means, for example by bonding, by press-fitting or by one or more fasteners. The target 32 may be formed of a rubber material with magnetic powder, of a magnetic alloy, of a plasto-ferrite or of an elasto-ferrite.

Detection means (not shown) are associated with the target 32 for tracking the rotation of the impulse ring 14 and the inner ring 16 around the axis X-X'. The detection means are disposed to radially face the inner surface of the target 32. For example, the detection means may include Hall-effect sensors. The target 32 is preferably a radial target but alternatively, the target 32 may be an axial target.

Alternatively, the target 32 and the detection means may use any other suitable technology instead of magnetic technology. For example, induction technology or optic technology may be implemented.

As will be described later, the target holder 30 also includes recesses 38 formed into the bore 30c in order to prevent angular movement relative to the sleeve 34. In the disclosed example, the target holder 30 is made in one part or piece. Further, the target holder 30 may be made of metal or plastic, formed by stamping or by any other suitable process.

The sleeve 34 is axially secured to the inner ring 16. Preferably, the sleeve 34 is mounted within the bore 16a of the inner ring 16 of the bearing 12. The sleeve 34 is secured into the bore 16a; more specifically, the sleeve 34 is preferably mounted and secured into the groove 16e of the bore 16a. The sleeve 34 may be secured into the bore 16a of the inner ring 16, for example, by axial press-fitting.

As discussed above, the sleeve 34 is axially secured to the inner ring 16. The sleeve 34 may also be angularly secured to the inner ring 16 to fasten in rotation the sleeve 34 and the inner ring 16, i.e., so as to prevent angular relative displacement between the sleeve 34 and the ring 16 during rotation. In this case, the sleeve 34 may be secured into the bore 16a by snapping, by gluing, by welding, by radial crimping or any other appropriate means.

The sleeve 34 includes an annular axial portion 34a defining the bore of the sleeve 34, and an outer radial portion or collar 34b extending radially from the axial portion 34a. The collar 34b extends radially outwardly from the axial portion 34a. The collar 34b extends an axial end of the axial portion 34a. In the illustrated example, the collar 34b extends purely radially. Alternatively, the collar 34b may extend obliquely, i.e. both radially and axially. In the disclosed example, the sleeve 34 is made in one part or piece. The sleeve 34 may be made of metal or plastic, formed by stamping or by any other suitable process.

The target holder 30 is mounted radially around the axial portion 34a of the sleeve 34. The radial portion 30a of the target holder 30 is mounted radially around the axial portion 34a of the sleeve 34. There is an annular radial gap 36 between the bore 30c of the target holder 30 and the axial portion 34a of the sleeve 34 before a radial deformation of the sleeve 34 as described below. The axial portion 34a of the sleeve 34 is secured to the inner ring 16 of the bearing 12. The axial portion 34a is mounted and secured into the bore 16a of the inner ring 16 of the bearing 12. More precisely, the axial portion 34a of the sleeve 34 is mounted and secured into the groove 16e of the bore 16a.

The target holder 30 is axially interposed and clamped between the lateral face 16d of the inner ring 16 and the radial collar 34b of the sleeve 34. The radial collar 34b axially abuts against the radial portion 30a of the target holder 30.

As previously mentioned, at least one and preferably a plurality of recesses 38 are preferably formed into the bore 30c of the target holder 30. The recesses 38 each extend radially outwardly from the bore 30c of the target holder 30. Each recess 38 is oriented radially toward the axial portion 34a of the sleeve 34, specifically each recess 38 radially faces the outer diameter of the axial portion 34a. The recesses 38 are spaced apart from each other in the circumferential direction and are preferably regularly or evenly spaced apart circumferentially. Further, each recess 38 extends in the circumferential direction over a limited angular sector.

Figure 5:
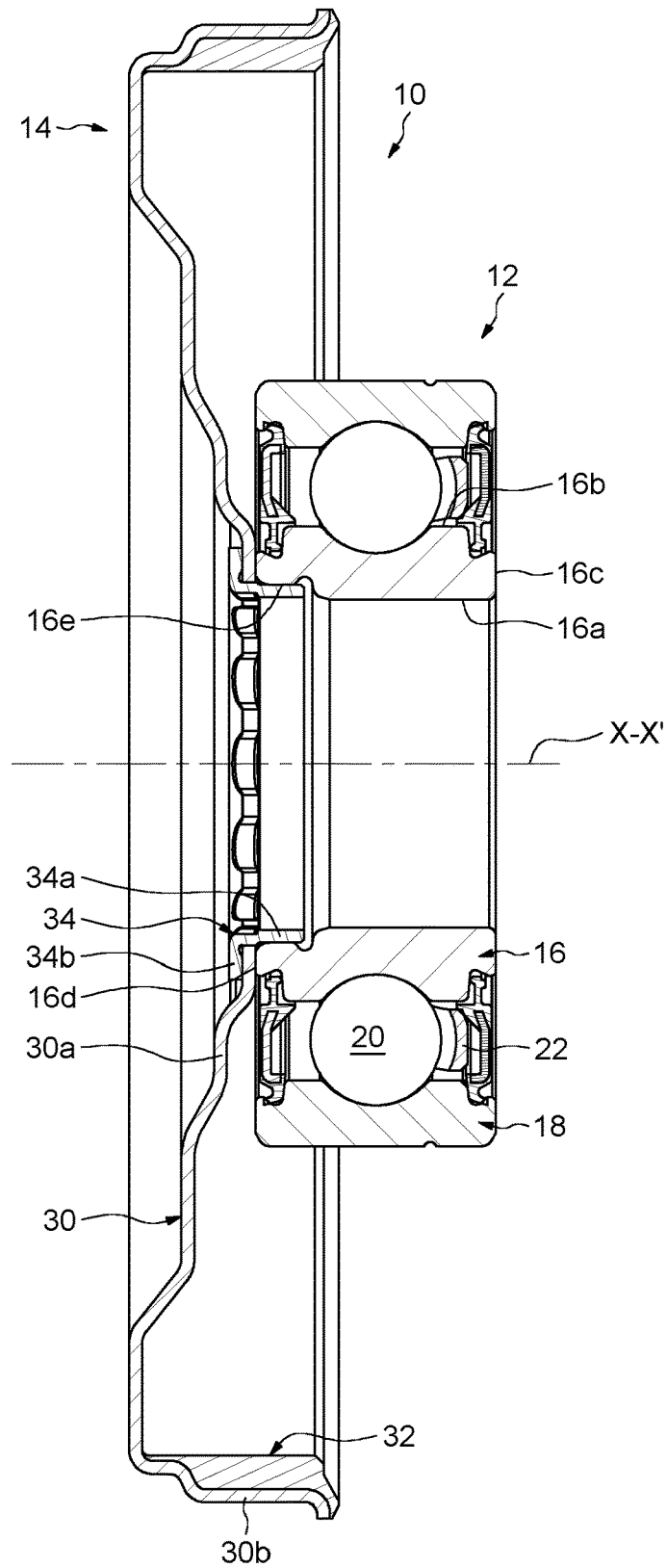
FIG. 5 is an axial section view of a sensor bearing unit of FIG. 1, after the plastic deformation step.
Figure 6:
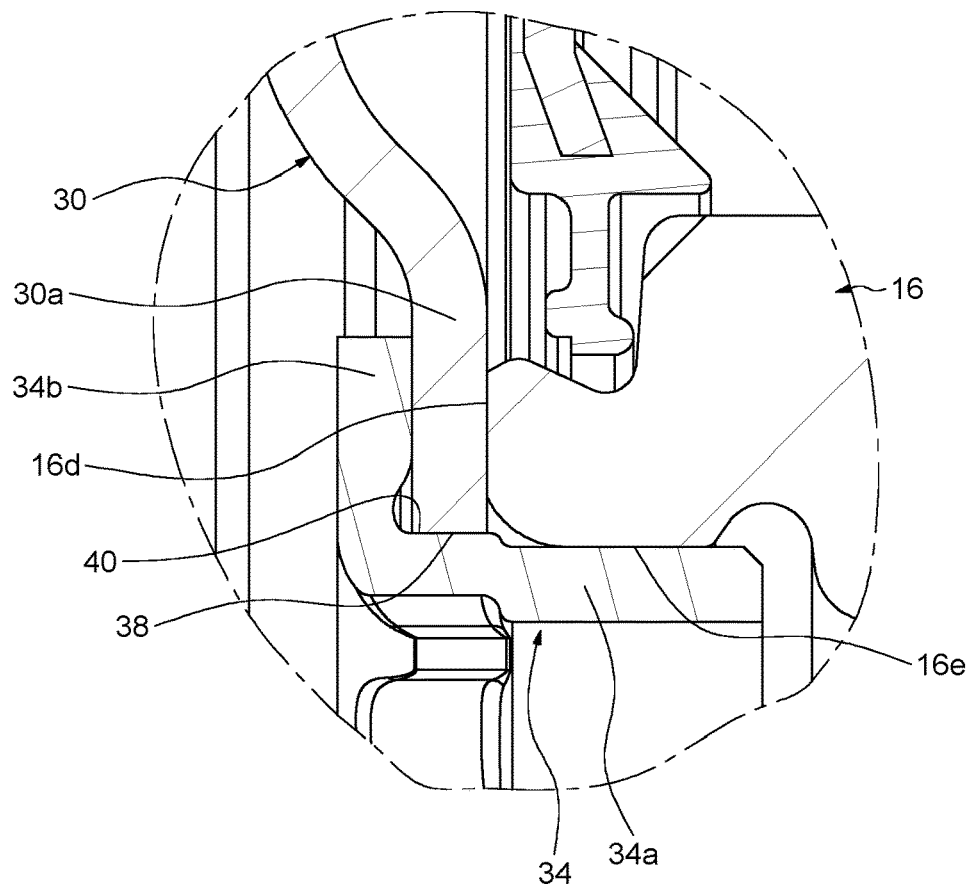
FIG. 6 is a detail view of FIG. 5.
Figure 7:
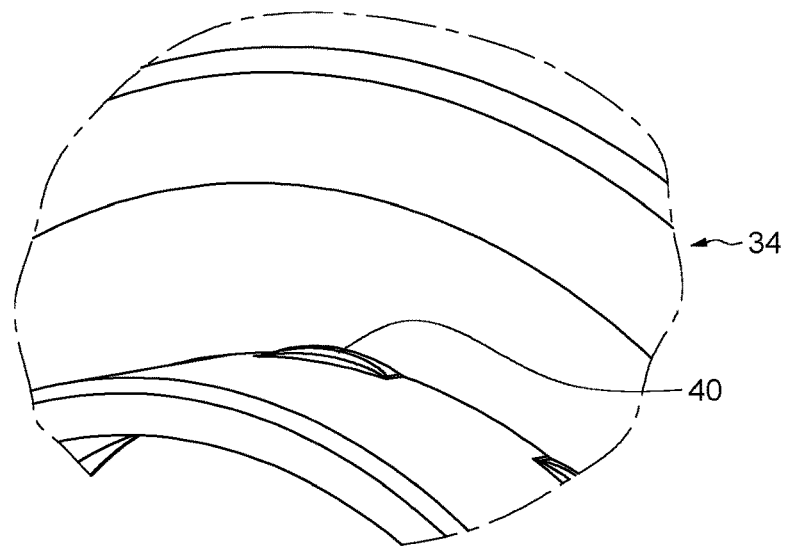
FIG. 7 is a detail view of the sleeve after deformation.

As shown on FIGS. 5 to 7, after the radial deformation of the sleeve 34, the axial portion 34a of the sleeve 34 comprises a plurality of radial bosses or protrusions 40 each extending radially into a separate one of the recesses 38 of the target holder 30 and being of complementary shape. The protrusions 40 extend radially outwardly from the axial portion 34a of the sleeve 34, and specifically the protrusions 40 extend outwardly from the outer surface of the axial portion 34a. The protrusions 40 protrude radially outwardly and extend axially along the axial portion 34a of the sleeve 34.

Due to the engagement of the one or more protrusions 40 of the sleeve 34 with the complementary recess(es) 38 of the target holder 30, any relative rotation or angular displacement of the target holder 30 relative to the sleeve 34 is prevented.

In the example embodiment described and depicted herein, the target holder 30 and the axial portion 34a of the sleeve 34 respectively comprise a plurality of recesses 38 and a plurality of protrusions 40. Alternatively, the target holder 30 and the axial portion 34a of the sleeve 34 may include only one recess 38 and one protrusion 46.

Preferably, the protrusions 40 are formed by a process of plastic deformation of the axial portion 34a of the sleeve 34. Specifically, during this process or step, a plurality of sections of the axial portion 34a of the sleeve 34 are each locally radially deformed towards the bore 30c of the target holder 30 in order to be plastically deformed into a separate one of the recesses 38.

More specifically, through the plastic deformation process/step, a section of the sleeve 34 is extended locally into the annular radial gap 36 towards the recess 38 and the protrusions 40 are formed. Such plastic deformation is preferably performed by radial crimping or stamping with specific tooling that have a complementary form to the one of the recesses 38. The result of the deformation step or process is illustrated in FIGS. 5 and 6.

Preferably, the deformation of the axial portion 34a of the sleeve 34 is conducted after the sleeve 34 is mounted inside the bore 16a of the inner ring 16. Alternatively, the axial portion 34a of the sleeve 34 may be deformed before mounting the sleeve 34 inside the inner ring bore 16a.

In order to improve the angular connection of the axial portion 34a of the sleeve with the inner ring, the bore 16a may be provided with a plurality of axial grooves extending axially along the cylindrical groove 16e of the bore 16a. Preferably, these grooves are formed by knurling or a similar metal working process.

In the illustrated examples, the sensor bearing unit 10 includes a rolling bearing 12 having only a single row of rolling elements 20. Alternatively, the rolling bearing 12 may include at least two rows of rolling elements 20. Also, in the depicted examples, the rolling elements 20 are balls. However, the rolling bearing 12 may include any other type(s) or combination of types of rolling elements, for example cylindrical rollers, tapered rollers, needles, spherical rollers, etc. In another variant, the rolling bearing 12 may also be formed as a sliding bearing or plain bearing having no rolling elements.

In the examples illustrated herein, the first ring 16 of the rolling bearing 12 is the inner ring whereas the second ring 18 is the outer ring, as discussed above. Alternatively, the present invention may be provided in a reversed arrangement with the first ring 16 being the outer ring and the second ring 18 being the inner ring. In such an arrangement, the target holder 30 is secured to the outer ring 16.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A sensor bearing unit comprising:
   a bearing including a first ring and a second ring, each one of the first and second rings being centered about an axis; and
   an impulse ring including a target holder, a target mounted on the target holder, and a sleeve secured to the first ring of the bearing, the sleeve having an axial portion with at least one radial protrusion and a collar extending at least partially radially, the target holder being mounted radially around the axial portion of the sleeve and axially between the first ring of the bearing and the collar of the sleeve, the at least one radial protrusion of the sleeve extending into a at least one complementary recess of the target holder.

2. The sensor bearing unit according to claim 1, wherein the complementary recess is provided on the bore of the target holder.

3. The sensor bearing unit according to claim 1, wherein the at least one radial protrusion of the sleeve axial portion includes a plurality of circumferentially spaced radial protrusions, the at least one complementary recess includes a plurality of complementary recess each one of the plurality of radial protrusions extending into the separate one of a plurality of complementary recesses of the target holder.

4. The sensor bearing unit according to claim 3, wherein the radial protrusions of the sleeve axial portion are evenly circumferentially spaced.

5. The sensor bearing unit according to claim 1, wherein the at least one radial protrusion of the sleeve axial portion is integrally formed with a remainder of the axial portion of the sleeve.

6. The sensor bearing unit according to claim 1, wherein the at least one radial protrusion of the sleeve axial portion is formed by radial plastic deformation of the axial portion of the sleeve.

7. The sensor bearing unit according to claim 1, wherein the first ring has a cylindrical surface and a plurality of axial grooves formed on the cylindrical surface, the sleeve radially abutting against the cylindrical surface of the first ring.

8. A method of manufacturing a sensor bearing unit comprising the steps of:
providing a bearing including a first ring and a second ring and an impulse ring including a target holder including at least one recess, a target mounted on the target holder, and a sleeve secured to the first ring of the bearing, the sleeve having an annular axial portion and a collar extending at least partially radially; and
forming at least one radial protrusion of the sleeve by locally radially pressing a section of the annular axial portion of the sleeve toward the at least one recess of the target holder so as to plastically deform the section into the recess.

9. The method according to claim 8, further comprising a step of securing the sleeve to the first ring.

10. The method as according to claim 9, wherein the sleeve is secured to the first ring by press-fitting.

11. The method according to claim 9, further comprising a step of forming a plurality of axial grooves on a cylindrical surface of the first ring against which the sleeve is intended to radially abut before the step of securing the sleeve to the first ring.

* * * * *